United States Patent
Qian et al.

(10) Patent No.: US 10,382,652 B2
(45) Date of Patent: Aug. 13, 2019

(54) GENERATING A DAY/NIGHT IMAGE

(71) Applicant: HEWLETT-PACKARD DEVELOPMENT COMPANY, L.P., Houston, TX (US)

(72) Inventors: Li Qian, Sant Cugat del Valles (ES); Xavier Domingo Reguant, Sant Cugat del Valles (ES); Secundino Vicente Vicente, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 22 days.

(21) Appl. No.: 15/540,908

(22) PCT Filed: Jan. 29, 2015

(86) PCT No.: PCT/EP2015/051851
§ 371 (c)(1),
(2) Date: Jun. 29, 2017

(87) PCT Pub. No.: WO2016/119866
PCT Pub. Date: Aug. 4, 2016

(65) Prior Publication Data
US 2018/0020124 A1 Jan. 18, 2018

(51) Int. Cl.
*H04N 1/58* (2006.01)
*B41J 3/60* (2006.01)
*G06T 7/194* (2017.01)

(52) U.S. Cl.
CPC ............ *H04N 1/58* (2013.01); *B41J 3/60* (2013.01); *G06T 7/194* (2017.01)

(58) Field of Classification Search
CPC ............ H04N 1/58; B41J 3/60; G06T 7/194
USPC ........................... 358/3.27, 1.9, 1.15
See application file for complete search history.

(56) References Cited

U.S. PATENT DOCUMENTS

| | | | |
|---|---|---|---|
| 4,764,791 A | 8/1988 | Omata et al. | |
| 5,144,328 A | 9/1992 | Blake et al. | |
| 5,801,721 A | 9/1998 | Gandy et al. | |
| 6,067,385 A * | 5/2000 | Cullen | H04N 1/00572 382/275 |
| 7,612,919 B2 | 11/2009 | Takahashi | |
| 7,813,002 B2 | 10/2010 | Schori | |
| 2001/0022854 A1* | 9/2001 | Yokoi | B07C 3/14 382/199 |
| 2004/0177540 A1 | 9/2004 | Abron | |

(Continued)

FOREIGN PATENT DOCUMENTS

| | | |
|---|---|---|
| CN | 100578575 | 1/2010 |
| CN | 102729627 | 10/2012 |
| WO | WO-2006051520 | 5/2006 |

*Primary Examiner* — Quang N Vo
(74) *Attorney, Agent, or Firm* — HP Inc. Patent Department

(57) ABSTRACT

According to one example, there is provided a method of generating a day/night image on a media. The method comprises obtaining an image to be printed as a front-to-back image, printing the obtained image on a first side of the media, processing the obtained image by flipping the image, applying a degree of edge removal, and applying a degree blur. The method further comprises printing the processed image on a reverse side of the media, such that the first printed image and printed modified image are substantially aligned with one another.

20 Claims, 6 Drawing Sheets

(56) References Cited

U.S. PATENT DOCUMENTS

| | | | | |
|---|---|---|---|---|
| 2005/0035538 | A1* | 2/2005 | Jewell | B41J 3/60 |
| | | | | 271/240 |
| 2008/0247660 | A1* | 10/2008 | Zhang | G06K 9/52 |
| | | | | 382/254 |
| 2009/0190162 | A1* | 7/2009 | Kohama | G06K 15/02 |
| | | | | 358/1.15 |
| 2011/0051177 | A1* | 3/2011 | Sugawara | G03G 15/36 |
| | | | | 358/1.15 |
| 2011/0261409 | A1* | 10/2011 | Mo | B41J 13/0036 |
| | | | | 358/1.15 |
| 2015/0049134 | A1* | 2/2015 | Shmaiser | G03G 15/238 |
| | | | | 347/1 |

* cited by examiner

GENERATING A DAY/NIGHT IMAGE

BACKGROUND

Printed images may be produced in such a way that enables them to be viewed when either mainly frontlit or mainly backlit whilst maintaining high image quality. This may be achieved, for example, by printing an image on a first side of a media, and printing the image flipped on a reverse side of the media, such that the two images are aligned. Such printed images may be used, for example, for high-value advertising. For example, during daylight the printed images may be viewed when frontlit, and during darkness the printed images may be viewed backlit. Irrespective of whether frontlit or backlit, the image is viewed with the intended color saturation. Such images are commonly referred to as day/night images.

BRIEF DESCRIPTION

Examples will now be described, by way of non-limiting example only, with reference to the accompanying drawings, in which.

DETAILED DESCRIPTION

To ensure high quality color reproduction irrespective of whether the printed image is mainly backlit or is mainly frontlit, it is common to generate such images by printing a first image on a first side of a media, and printing a second, flipped copy of image, on the reverse side of the media. However, such techniques demand a high level of front-to-back image alignment, since any image misalignment (or mis-registration) may result in a blurred image being viewed, especially when backlit. The flipped copy may be flipped either horizontally or vertically, depending on the orientation of the media when the reverse side of the media is printed on.

Duplex printers that have dual print engines may be able to print such images with the demanded level of image alignment. However, dual print engine printers are typically more expensive than printers that have a single print engine.

Duplex printing may be achieved in a printer having a single print engine by manually, or automatically, inverting and reinserting a printed sheet into a printer to enable an image to be printed on a reverse side of a media.

Although such printers may be manufactured that are able to provide an appropriate level of front-to-back alignment, such printers typically have to have highly accurate mechanical tolerances. Accordingly, such printers may be more expensive than printers that provide lower accuracy front-to-back alignment.

Achieving a high-level of front-to-back alignment may be further compounded by the effects of changes in media size during printing.

For example, front-to-back images may be printed on plastic-type media, such as PVC or PET films. Such films are thermo-deformable, and thus may change size during printing. This may be particularly noticeable where thermal drying and/or curing is used during printing, for example when using latex inks.

A reduction in image quality of a day/night image may be perceivable, when viewed at a short viewing distance, when front-to-back image misalignment is greater than about 1 mm.

Examples described herein, however, enable printers to produce high-quality day/night images even if they are unable to achieve front-to-back alignment to a high degree of accuracy. For example, the examples the described herein may enable high-quality day/night images to be produced when front-to-back image misalignment is up to about 3 mm. Further, the examples described herein may enable lower quality day/night images, that may however remain of an acceptable quality in some situations, to be produced when the front-to-back image misalignment is between about 3 mm and 5 mm. This may enable high-quality day/night images to be producible on a wider range of printers than is currently possible, for example on many cheaper printers that are not able to provide highly accurate front-to-back image alignment.

Figure 1:
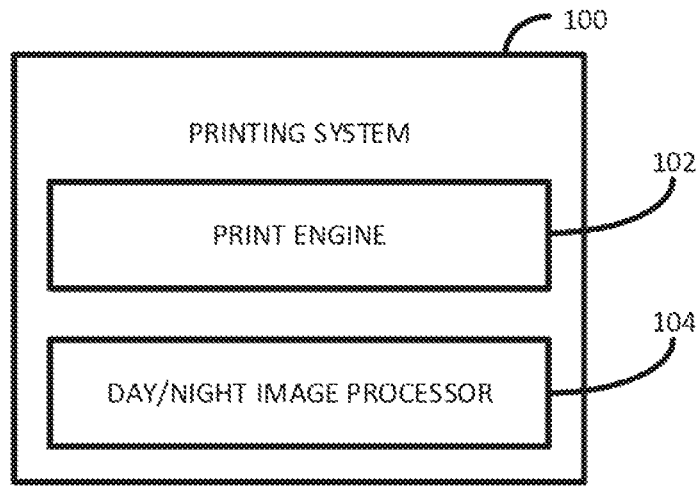
FIG. 1 is simplified schematic illustration of a printing system according to one example.

Referring now to FIG. 1 there is shown a simplified schematic view of a printing system 100. The printing system 100 comprises a print engine 102 that may be any suitable printing system, such as an inkjet printing system, a liquid electro-photographic (LEP) printing system, a dry laser toner printing system, or the like.

The printing system 100 may accept sheets of media from a media stacker (not shown), or may print on rolls or webs of media.

The printing system 100 enables printing to be performed by the print engine 102 on both sides of media. For example, the printing system 100 may comprise a duplexing media handling unit (not shown) to automatically flip and reinsert a sheet of media back into the printing system to enable a single printing engine to print on both sides of a media, in two separate printing operations. In another example, the printing system 100 may not have a duplexing media handling unit, but may enable a user to manually flip a printed sheet of media and reinsert it into the printing system 100 to enable the print engine 102 to print on both sides of the a media, in two separate printing operations.

The printing system 100 may be designed such that, when used to print on both sides of a media, the alignment between front and back images is achievable with a degree of accuracy less than about 5 mm. In other words, when an image is printed on both sides of the media any corresponding point on the image may be misaligned within a distance of up to about 5 mm.

The printing system 100 further comprises a day/night image processor 104 to enable the printing system 100 to produce quality day/night images, where the front-to-back alignment accuracy is less than about 5 mm. The day/night image processor 104 processes an image obtained by the printing system 100 to be printed as a day/night image, as described further below.

Figure 2:
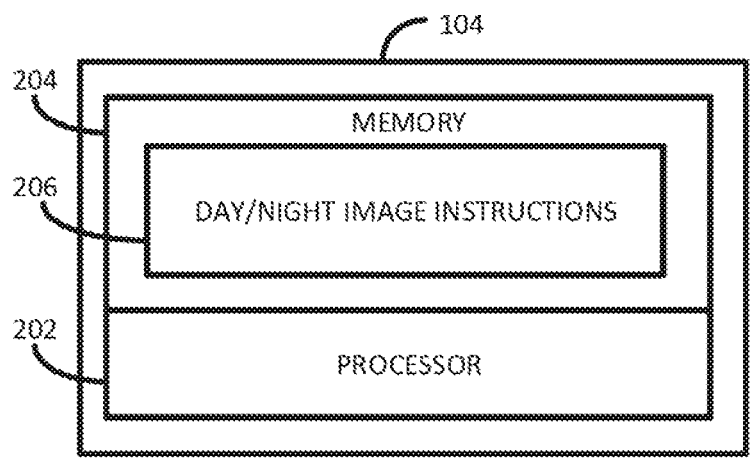
FIG. 2 is a block diagram of a day/night image processor according to one example.

Further details of the day/night image processor 104 are shown in FIG. 2. The day/night image processor 104 comprises a processor 202 such as a microprocessor, microcontroller, or the like. The processor 202 is coupled to a memory 204 via a suitable communication bus (not shown). The memory 204 stores day/night image processing machine readable instructions 206 that, when executed by the processor 202, control the printing system 100 to produce day/night images as described herein.

Figure 3:
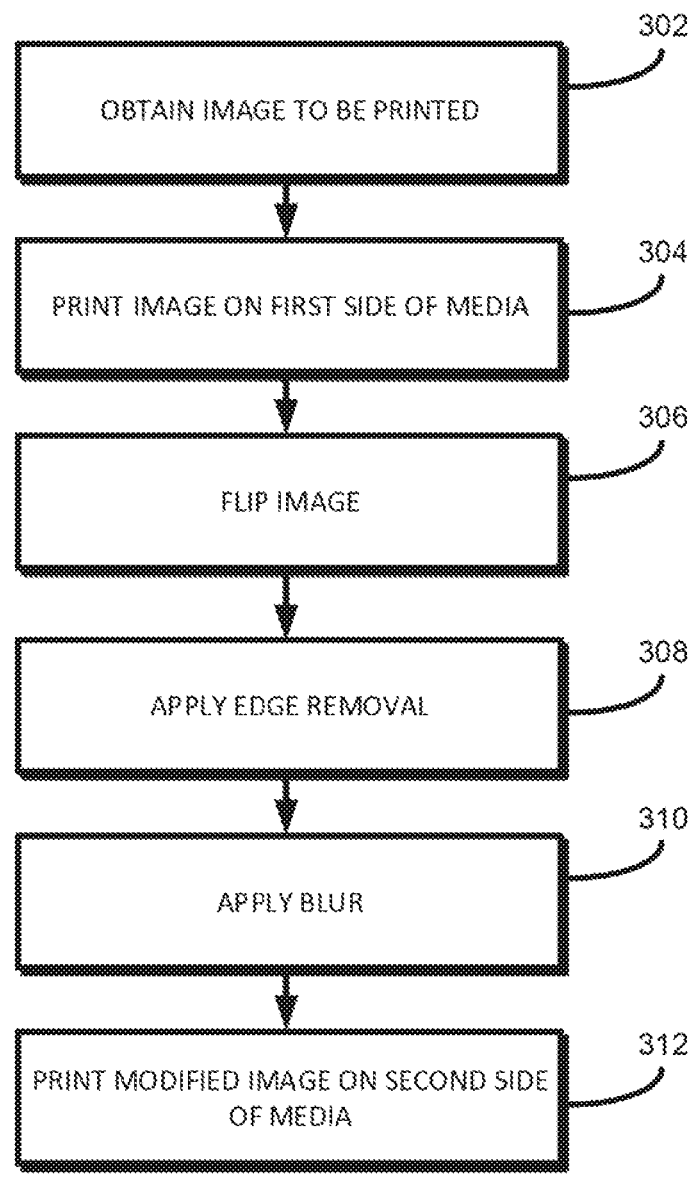
FIG. 3 is a flow diagram outlining an example method according to one example.

Operation of the printing system 100 will now be described with reference to the flow diagram of FIG. 3, which outlines an example method according to one example. Further reference is made to FIGS. 4, 5, and 6.

Figure 4A:
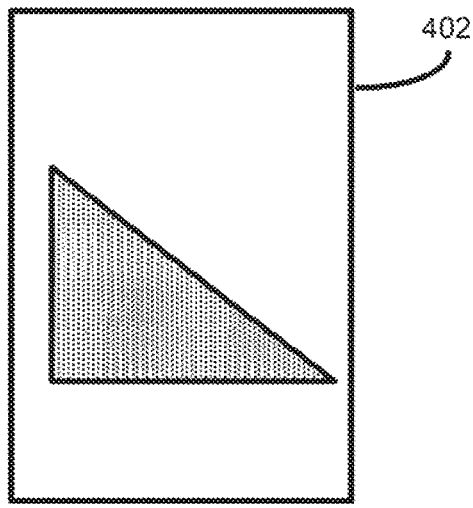
FIGS. 4a to 4d illustrate a number of images processed according to one example.
Figure 4B:
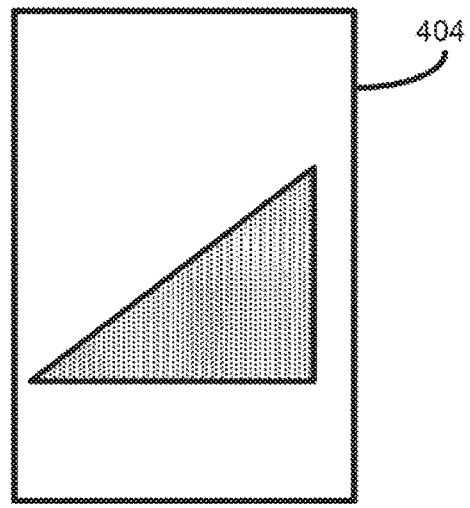
Figure 4C:
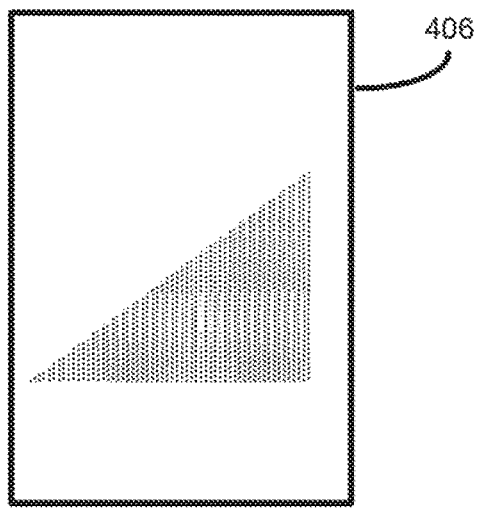
Figure 4D:
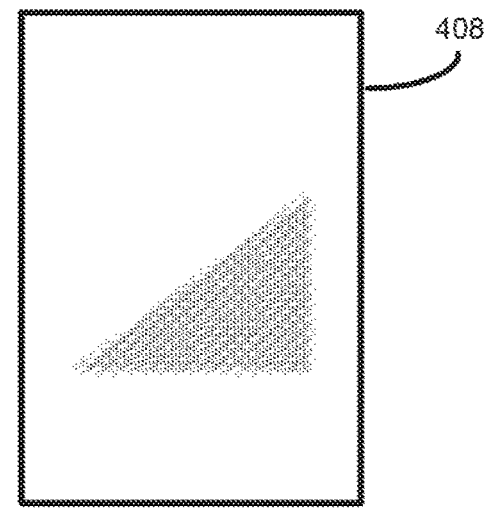

At block 302, the printing the day/night image processor 104 obtains an image 402, illustrated in FIG. 4a, to be printed as a day/night image. In one example the obtained image is received by the printing system 100 from a printer driver (not shown) of a computing device that instructs the printing system 100 to print an image. The obtained image may have data associated therewith that indicates to the printing system 100 that the image is to be printed as a day/night image. This may be indicated, for example, by a user through a user interface of the printer driver. In another example, the obtained image may be received by the printing system 100 from a printer driver, and a user may select, via a user interface of the printing system 100, to print the obtained image as a day/night image.

At block 304, the processor 104 controls the printing system 100 to print the image 402 on a first side of a media.

At block 306, the processor 104 processes the image 402 to flip the image 402 to generate a flipped image 404.

At block 308, the processor 104 processes the image 404 by applying edge removal to the flipped image 404 to generate a further image 406. The aim of applying edge removal is to transform high frequency edges within the image to low frequency edges. This helps remove small details, such as fine lines, from the image 406. If the image 406 includes alphanumeric characters, the edge removal removes edges of any characters, such that their edges are eroded to a soft blurring effect, thus creating a soft transition from the character color to the surrounding background.

In one example the degree of edge removal applied is a predetermined amount. In one example the edge removal may be applied within the range of about 1 to 5 mm. For example, if the amount of front-to-back misalignment is known to be 3 mm, the edge removal technique applied may erode the edge up to 3 mm in an inwards direction.

In one example edges may be removed from the image 404 by applying a Canny edge detection function to the image data, or by applying high-pass filtering using, for example, the Sobel operator. In other examples a more sophisticated approach may use the Laplacian of Gaussian (LoG).

At block 310, the processor 104 processes the image 406 by applying blur to generate a final image 408. In one example the degree of blurring applied is a predetermined amount. For example, if the amount of front-to-back misalignment is known to be 3 mm, the blurring process may be applied using a filter having a radius of about 3 mm. In one example the same degree edge detection and blurring may be applied. In other examples, however, the degree of edge detection applied may be greater of smaller than the degree of blurring applied.

In one example blurring may be applied by applying a Gaussian blur function to the image data. In other examples other types of blurring or defocusing functions may be used.

At block 312, the processor 104 controls the printing system 100 to print the final image 408 on a second side of the media.

By removing edges from image 404 and applying blurring helps remove image features on the image 408 that may become visible when backlit if the image 408 and 402 are not accurately front-to-back aligned. Furthermore, the blurring helps ensure proper color saturation of the image 402 when backlit.

In other examples the order of the method described above may be modified without affecting the final image 408. For example, the edge removal and blurring may be performed prior to the image being flipped without affecting the final image 408. Similarly, the edge removal may be performed, followed by flipping the image, followed by blurring, without affecting the final image 408. Other ordering may also be applied.

Figure 5:
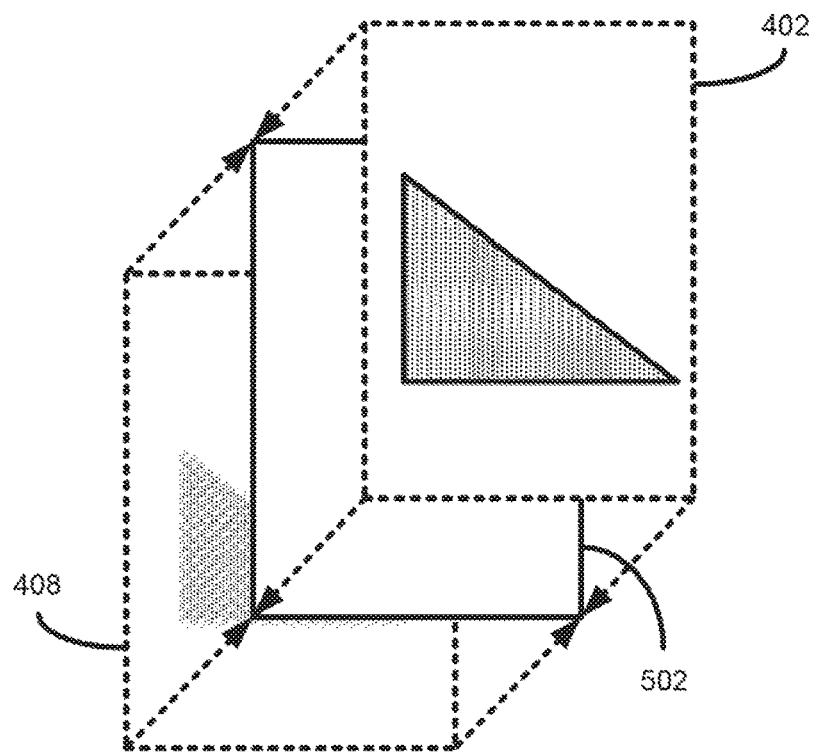
FIG. 5 is an illustration showing an exploded view of a day/night image according to one example.

The result of the above-described method is illustrated in FIG. 5, which is an exploded illustration of day/night image. A media 502 has printed on a first side thereof the obtained image 402, and has printed on a second side thereof the final image 408. A top view of the media 502, looking down on the first side of media 502, is also illustrated in FIGS. 6a to 6c. The final image 408 is shown superimposed on the obtained image 408 to more clearly show the alignment of image 402 and image 408.

Figure 6:
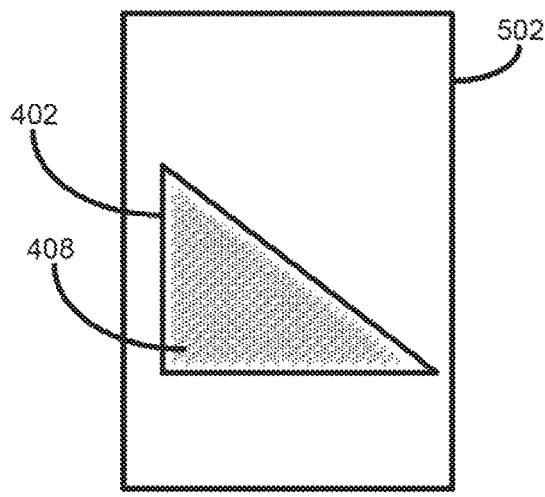
FIG. 6 is an illustration showing a front and rear image of day/night image according to one example.

FIG. 6 illustrates an example where the images 402 and 408 are substantially aligned within acceptable alignment tolerances described above.

However, as described above, the combination of edge removal and blurring processing applied to the image 408 printed on the second side of a media in a day/night image ensures that day/night images printed with up to about 5 mm of front-to-back misalignment provide are of a high-quality.

Figure 7:
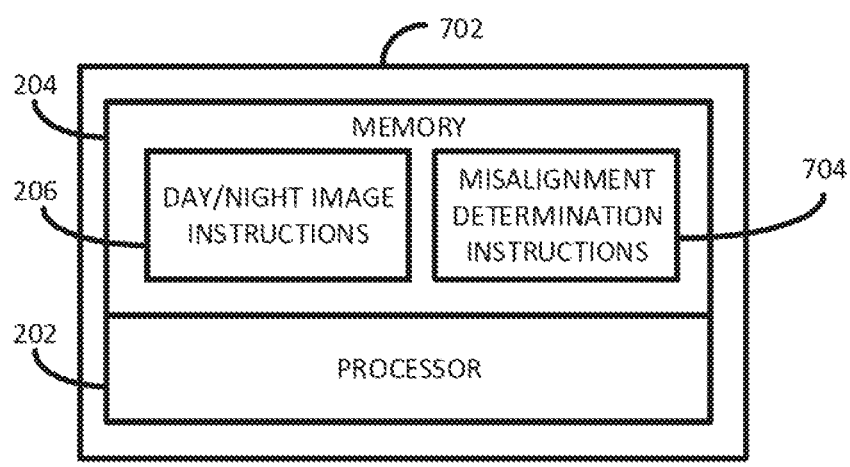
FIG. 7 is a block diagram of a day/night image processor according to one example.

Referring now to FIG. 7, there is shown a day/night image processor 702 according to a further example. In addition to the previously described features of the day/night image processor 104, the processor 702 additionally comprises a misalignment determination instructions 704.

Figure 8:
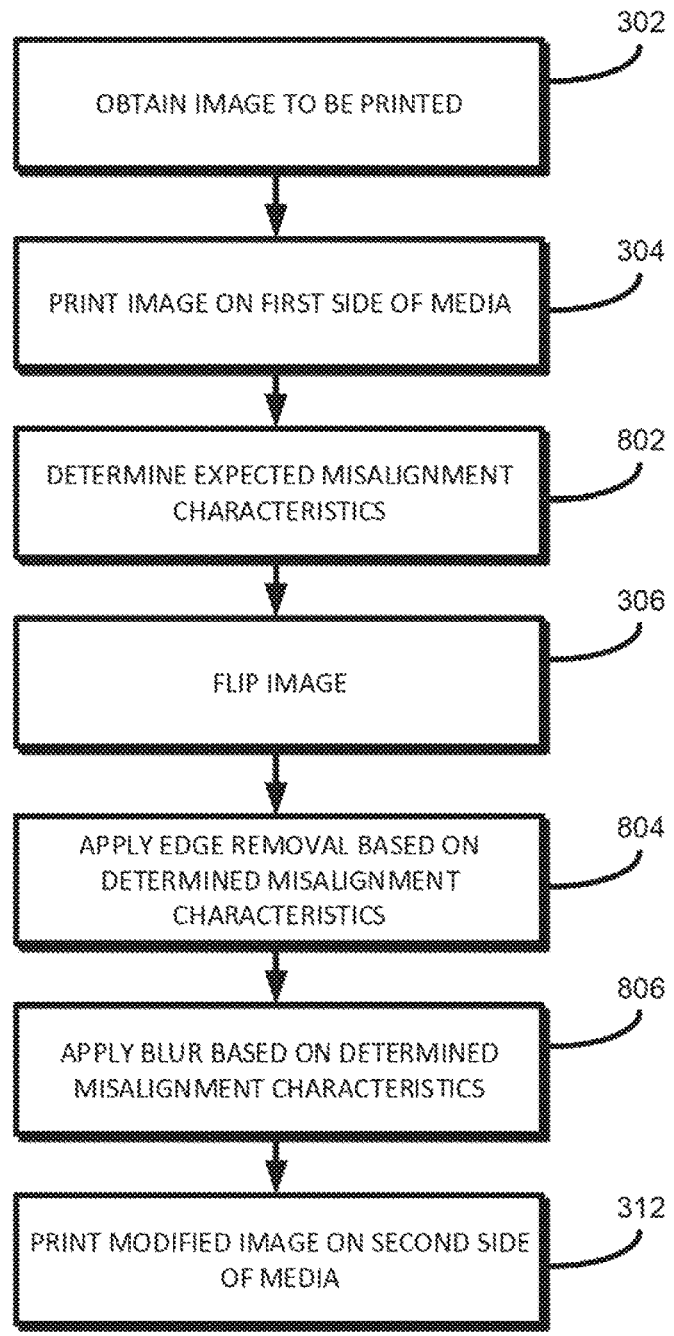
FIG. 8 is a flow diagram outlining an example method according to one example.

Operation of the day/night image processor 702 according to one example will now be described with reference to the flow diagram of FIG. 8, which outlines an example method according to one example.

At block 302, the printing the day/night image processor 702 obtains an image 402, illustrated in FIG. 4a, to be printed as a day/night image. In one example the obtained image is received by the printing system 100 from a printer driver (not shown) of a computing device that instructs the printing system 100 to print an image. The obtained image may have data associated therewith that indicates to the printing system 100 that the image is to be printed as a day/night image. This may be indicated, for example, by a user through a user interface of the printer driver. In another example, the obtained image may be received by the printing system 100 from a printer driver, and a user may select, via a user interface, to print the obtained image as a day/night image.

At block 304, the processor 702 controls the printing system 100 to print the image 402 on a first side of a media.

At block 802, the processor 702 determines an expected misalignment characteristic of the printing system 100.

In one example, this may be based on the type, or characteristics, of a media on which the day/night image is to be printed. For example, if the day/night image is to be printed on a thermo-deformable plastic film a media deformation factor for that media type may be determined or obtained. For example, the media type may be identified to the printer by a user, or may be detected by the printing system 100, using an appropriate sensor or detection apparatus. For example, it may be known that a given media type expands or contracts by a certain factor when printed upon using a given printing process. For example, if an image is printed on the media using latex ink, a thermal cure stage of the printing process may cause the media to expand and subsequently contract, such that size of the media changes.

In one example, the expected misalignment characteristics may be based, for example, on the type of printing system, on the type of ink used, the presence (and characteristics) of any thermal drying or curing processes, etc.

In one example the misalignment determination instructions 704 may comprise a look-up table. In another example the misalignment determination instructions 704 may obtain misalignment characteristics from an external resource, such as a remote network location.

At block 802, the processor 702 thus obtains or determines an estimated front-to-back misalignment amount. In one example, the processor 702 may obtain or determine an estimated front-to-back misalignment amount, as well as an estimated front-to-back misalignment direction.

At block 306, the processor 702 processes the image 402 to flip the image 402 to generate a flipped image 404.

At block 804, the processor 702 processes the image 402 by applying edge removal to the flipped image 404 to generate a further image 406. The degree of edge removal applied is based on the estimated front-to-back misalignment amount. The aim of applying edge removal is to transform high frequency edges within the image to low frequency edges.

In one example edges may be removed from the image 404 by applying a Canny edge detection function to the image data, and subtracting the resultant from the image 404. In other examples other types of edge detecting functions may be used.

At block 806, the processor 702 processes the image 406 by applying blur to generate a final image 408. The degree of edge removal applied is based on the estimated front-to-back misalignment amount. For example, if the estimated front-to-back misalignment amount is estimated to be about 3 mm, the blurring function applied may apply blurring about 3 mm worth of image pixels.

In one example blurring may be applied by applying a Gaussian blur function to the image data. In other examples other types of blurring or defocusing functions may be used. For example, if the amount of front-to-back misalignment is known to be 3 mm, the edge removal technique applied may erode the edge up to 3 mm in an inwards direction. In one example the same degree edge detection and blurring may be applied. In other examples, however, the degree of edge detection applied may be greater of smaller than the degree of blurring applied. In one example the amount of edge detection and blurring may be determined based on user feedback, via a suitable user interface, to the printing system, for example following a visual inspection of a day/night printed image.

At block 312, the processor 702 controls the printing system 100 to print the final image 408 on a second side of the media.

If the printing system 100 prints on rolls or webs of media, the processor 104 may control the printing system 100 to print a series of front images on the roll. The roll may then be reversed within the printing system, and the processor 104 may control the printing system 100 to print a series of back images on the reverse side of the media, with the back images printed in alignment with their corresponding front image.

It will be appreciated that examples described herein may be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, examples described herein provide a program comprising code for implementing a system or method as claimed in any preceding claim and a machine readable storage storing such a program.

All of the features disclosed in this specification (including any accompanying claims, abstract and drawings), and/or all of the operations of any method or process so disclosed, may be combined in any combination, except combinations where at least some of such features and/or operations are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

The invention claimed is:

1. A method comprising:
obtaining, by a system comprising a hardware processor, an image to be printed as a day/night image on a media;
printing, by the system, the obtained image on a first side of the media;
processing, by the system, the obtained image to produce an output image by:
flipping the obtained image to generate a flipped image, applying a degree of edge removal to the flipped image, and
applying a degree of blur to the flipped image; and
printing, by the system, the output image produced based on the flipping, the applying of the degree of edge removal, and the applying of the degree of blur on a reverse side of the media, such that the obtained image printed on the first side and the output image printed on the reverse side are substantially aligned with one another.

2. The method of claim 1, further comprising applying the degree of edge removal within a range of about 1 to 5 mm.

3. The method of claim 1, further comprising applying the degree of blur within a range of about 1 to 5 mm.

4. The method of claim 1, further comprising:
determining an expected misalignment between images printed on the first side and the opposite side of the media.

5. The method of claim 4, wherein the degree of edge removal applied is based on the expected misalignment.

6. The method of claim 4, wherein the degree of blur applied is based on the expected misalignment.

7. The method of claim 4, wherein determining the expected misalignment comprises one or more of:

determining a type of the media; and
determining a type of printing system.

8. The method of claim 1, wherein the flipped image includes a copy of the obtained image.

9. The method of claim 1, wherein applying the degree of edge removal to the flipped image comprises transforming edges within the flipped image to create soft transitions in the flipped image.

10. The method of claim 1, wherein applying the degree of blur to the flipped image comprises applying a Gaussian blur to the flipped image.

11. A printing system comprising:
a print engine to print on a media; and
a processor to:
 obtain an image to be printed;
 control the print engine to print the obtained image on a first side of the media;
 process the obtained image to:
  flip the obtained image to produce a flipped image,
  remove a degree of edges in the flipped image, and
  apply a degree of blur in the flipped image; and
 control the print engine to print the processed image produced by the processing of the obtained image on a second side of the media, the second side opposite the first side.

12. The printing system of claim 11, wherein the processor is to determine an expected degree of misalignment between the obtained image printed on the first side and the processed image printed on the second side of the media.

13. The printing system of claim 12, wherein the processor is to remove the degree of edges based on the expected degree of misalignment.

14. The printing system of claim 12, wherein the processor is to apply the degree of blur based on the expected degree of misalignment.

15. The printing system of claim 12, wherein the processor is to determine the expected degree of misalignment based on at least one of: a media type of the media, and characteristics of the printing system.

16. The printing system of claim 11, wherein the flipped image includes a copy of the obtained image.

17. The printing system of claim 11, wherein the obtained image is associated with information indicating that the obtained image is to be printed as a day/night image, and wherein the processor is to perform the processing of the obtained image and the control of the printing of the processed image on the second side based on determining from the information that the obtained image is to be printed as the day/night image.

18. The printing system of claim 11, wherein removing the degree of edges in the flipped image comprises transforming edges within the flipped image to create soft transitions in the flipped image.

19. A non-transitory machine-readable storage medium storing instructions that upon execution cause a system to:
 obtain an image to be printed on a media;
 control a printing system to print the obtained image on a first side of the media;
 process the obtained image to produce an output image by:
  flipping the obtained image to produce a flipped image, the flipped image comprising a copy of the obtained image,
  apply edge removal to the flipped image, and
  apply blurring to the flipped image, and
 control the printing system to print the output image on a reverse side of the media.

20. The non-transitory machine-readable storage medium of claim 19, wherein applying the edge removal to the flipped image comprises transforming edges within the flipped image to create soft transitions in the flipped image.

* * * * *